March 13, 1962     B. V. STRIANESE ETAL     3,024,986
MEASURING SYSTEM EMPLOYING DIGITAL ELECTRONIC CIRCUITRY
Filed May 4, 1959     2 Sheets-Sheet 1

*INVENTORS*
JAMES B. O'MALEY
BERNARD V. STRIANESE
BY Leonard H. King

March 13, 1962    B. V. STRIANESE ET AL    3,024,986
MEASURING SYSTEM EMPLOYING DIGITAL ELECTRONIC CIRCUITRY
Filed May 4, 1959    2 Sheets-Sheet 2
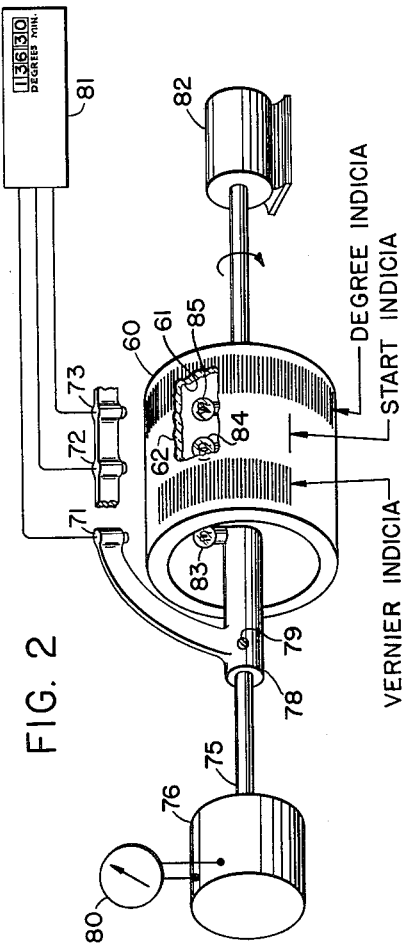
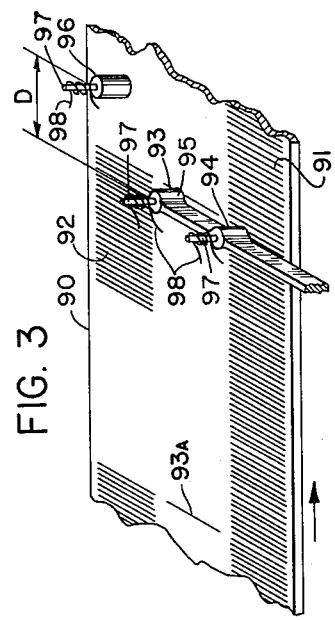
INVENTORS.
JAMES B. O'MALEY
BERNARD V. STRIANESE
BY
Leonard H. King

3,024,986
MEASURING SYSTEM EMPLOYING DIGITAL ELECTRONIC CIRCUITRY
Bernard V. Strianese, 2475 Ocean Ave., Brooklyn, N.Y., and James B. O'Maley, Seaford Harbor, N.Y., assignors to said Bernard V. Strianese
Filed May 4, 1959, Ser. No. 810,849
14 Claims. (Cl. 235—92)

This invention relates to measuring devices providing accurate digital readout and, more particularly, but not limited thereto, to means for accurately determining the physical position of a movable member such as the angular position of a rotatable shaft or the like.

In general, prior art angular position detectors take the form of a drum or disc having uniformly spaced indicia placed around the periphery or edge. The drum rotates with the shaft whose angular position is to be determined and the corresponding indicia determined by an index or pointer as employed on the tuning dial of a radio. More complex variations of the basic device employ counting means to determine the indicia being read. However, the resolution of such prior systems are limited by the finite spacing between indicia.

The present invention provides means to accurately determine positions between successive indicia, thereby providing a higher order of resolution than previously obtainable.

It is a principal object of this invention to provide an improved measuring device.

It is therefore an important object of this invention to provide a completely novel position sensing device.

A feature of this invention is the provision of an electronic vernier means for measuring devices.

Another important object of this invention is to provide a digital indication of angular rotation or displacement.

Still another object of this invention is to provide a device which facilitates digital readout in either decimal or nondecimal units for example, degrees, minutes, and seconds.

Still another important object of this invention is to provide a digital indication of angular rotation for any device capable of assuming various angular positions.

The features of the invention which are believed to be novel are set forth with particularity in the appended claims. The invention itself, however, both as to its organization and method of operation, together with further objects and advantages thereof, may best be understood by reference to the following description taken in conjunction with the drawings in which:

FIGURE 2 represents pictorially an alternate embodiment of the device also arranged to measure the angular position of a shaft.

FIGURE 3 shows the invention as embodied in a rectilinear position detecting device.

Figure 1:
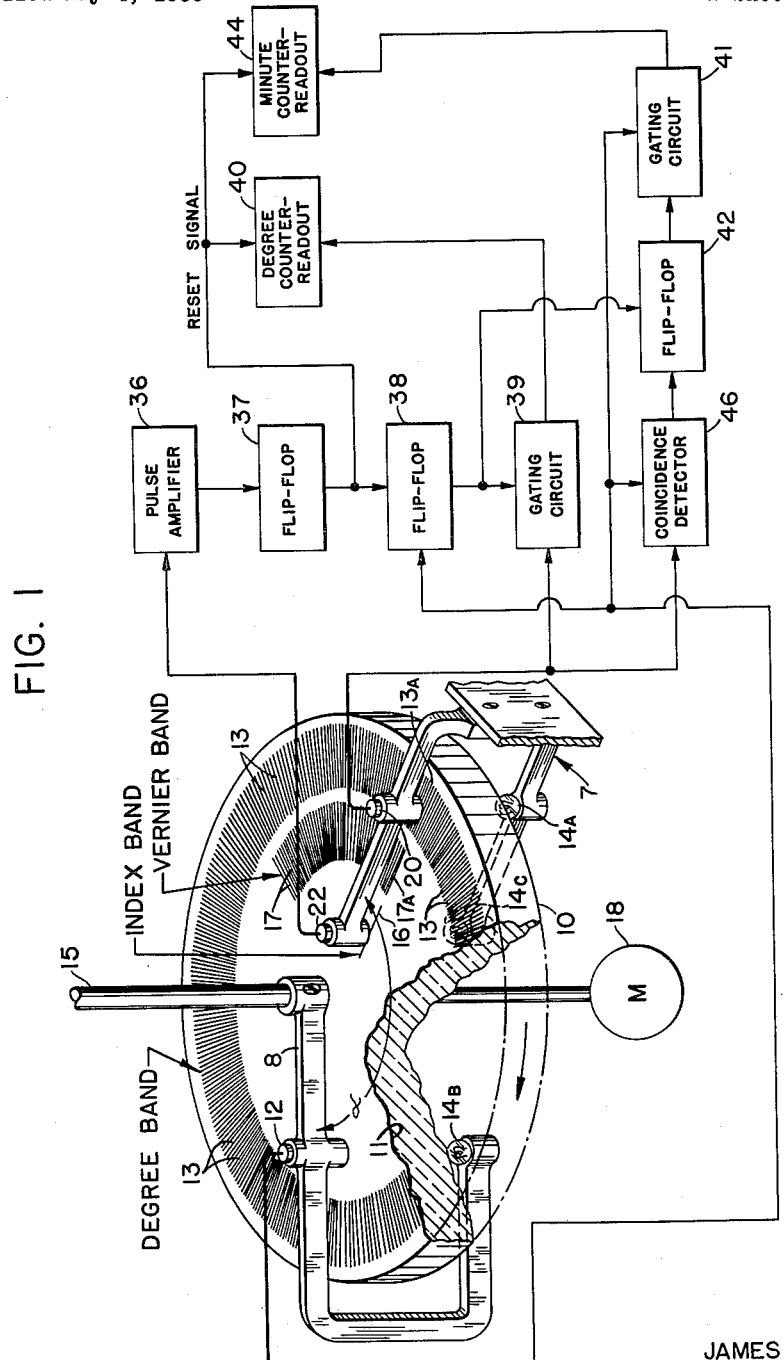
FIGURE 1 shows in part pictorially and in part by means of a block diagram a shaft angular position sensing apparatus embodying the principles of the invention.

An understanding of the operation can be best achieved by examining a typical system. For example, consider one for a readout of an angle in the form of degrees and minutes.

Marker wheel 10 is formed of an optically transparent base material such as polymethyl methacrylate or glass and is coated with a layer of optically opaque material 11. Indicia 13 are provided at 1° intervals in an annular outer band designated the "Degree Band." The indicia 13 are engraved into the layer of opaque material 11 so as to expose the transparent base. A light source 14a behind the marked wheel renders the indicia 13 visible.

A single light source may be used if the transparent base is adapted to diffuse the light throughout the base so as to render the indicia visible to the various photocells discussed hereinafter. In place of the conventional lamp shown, a panel type luminescent light source may be employed or individual lamps may be deployed opposite each photocell as shown.

A second annular band, concentric with the outer band, and designated as the "Vernier Band" has engraved thereon 60 indicia 17, in a 59° quadrant, (59' per division) and serves as a vernier as disclosed hereinafter. The first and last indicia of the "Vernier Band" are located on common radii with indicia of the "Degree Band."

In a third radially spaced concentric annular band designated as the "Index Band," there is engraved a reset-start index 16. The index 16 is aligned with the first indicia 17a and with a degree indicia 13a.

Associated with each band are the aforementioned photocells and light sources. Photocell 20 and lamp 14a monitor the degree indicia 13, photocell 22 and lamp 14c monitor "reset-start" index 16, and photocell 12 and lamp 14b monitor vernier indicia 17. Photocell 12 is supported by member 8 which is adapted to be coupled to an input device 15 whose angular position is to be indicated. Lamp 14b likewise supported by member 8, moves as a unit with photocell 12. The angular position of photocell 12 with respect to the position of photocells 20 and 22, which are on a common radius, corresponds to the angular position of the input shaft. Fixed member 7 supports photocells 20 and 22 and their associated light sources.

Assume marker wheel 10 to be rotated continuously in a clockwise direction by motor 18. Also assume that the movable photocell 12 referred to hereinafter as the "vernier photocell" has been positioned by input shaft 15 to an angle, α, of 91° 30'. If wheel 10 rotates from the position shown and in the direction shown by the arrow, "reset-start" mark 16 engraved into the wheel will pass the "reset-start" pickoff photocell 22. The pulse thus developed is applied to "reset-start" pulse amplifier 36, which triggers flip-flop stage 37 to state #1, the next revolution of the wheel 10 generates a second pulse, causing flip-flop stage 37 to advance to state #2, which in turn triggers binary or flip-flop stage 38 to that state which opens counter gating circuit 39. When the counter gate 39 is in its open condition, pulses corresponding to degree marks 13 on wheel 10 will be fed from the degree counter photocell 20 via counter gating circuit 39, to the degree counter and readout unit 40. Counter 40 continues to count pulses until the first vernier mark 17a passes the vernier photocell 12. The first pulse from vernier photocell 12 triggers "flip-flop" 38 to its alternate or #2 state, which in effect closes gating circuit 39. This action occurs when the start index of wheel 10 has rotated through an angle of 91° 30' from the "reset-start" photocell 22. Marker pulses received by cell 20 are also applied to a dual input coincidence detector 46 as one of the inputs. Flip-flop stage 38 in changing to its second or #2 state triggers "flip-flop" circuit 42 to its #1 state which in turn sets gating circuit 41 to its open or conducting state. Subsequent pulses generated by vernier indicia 17, as sensed by vernier photocell 12, are fed simultaneously, (1) through open gating circuit 41 to the minute counter 44, and (2) to coincidence detector 46 until the thirty-first pulse is generated by the vernier indicia 17.

By virtue of the fact that the latter marks are 59' apart, the 31st pulse will be generated after the wheel has rotated an additional 30° or a total of 30'. Thus the 121st impulse from the degree counter photocell 20 will be generated simultaneously with the 31st pulse from vernier photocell 12. Both pulses being simultaneously applied to coincidence detector 46, this coincident event develops an output pulse which triggers flip-flop state 42 to state #2 which in turn closes gating circuit 41. Gating circuit 41 in the closed state prevents further registering of pulses by minutes counter 44. It is to be appreciated that the initial pulse derived from the vernier band is not counted and therefore the thirty-first pulse corresponds to a count of thirty vernier spaces.

Counter 40 would then display a reading of 91° and the minutes counter 44 a reading of 30'. This display remains for an additional wheel revolution after which time both counters are reset to an initial reading, say a reading of zero, by a mechanism actuated by a pulse generated by the "reset-start" indicia. It was earlier pointed out that the start pulses applied to reset amplifier 36 placed flip-flop stage 37, in sequence, in state #1 and state #2. In the latter state an appropriate reset voltage is applied to the indicators.

The vernier indicia may be spaced say 0.9° apart so that the readout will be in decimal terms. Thus, if a fraction of a degree is to be read, say 0.7°, then coincidence will occur at the 7th impulse from the degree counter 20 subsequent to the disabling of the degree counter. It is to be noted that the latter pulse is in coincidence with the eighth pulse from the venier cell but the initial pulse from the vernier serves to trigger gating circuit 41 to its open condition and consequently is not registered as a count.

Motor 18 serves to drive the wheel at a continuous rate; 20 revolutions per second having been found satisfactory. This insures that there is continuous recording of the measured angle.

Other prior art circuits have relied on the measurement or counting of pulses. One disadvantage of such prior type circuit is that the pulses are generated irrespective of direction of movement and therefore a direction sensing means must be provided. In the apparatus of this invention the repeating indication occurs so frequently that direction sensing means are unnecessary.

Flip-flop circuit 37 provides a delay of one revolution of wheel 10 between each cycle. If a longer delay is desired, additional cascaded flip-flop stages may be employed. Other conventional delay circuits may be substituted for the flip-flop circuit to provide any desired delay period.

In FIGURE 2 there is disclosed an alternate embodiment of the invention employing an indicia bearing drum 60 in place of wheel 10.

The drum is composed of a transparent material such as methyl methacrylate 61, coated with an opaque material such as a black lacquer 62. Portions of the coating 62 are removed by engraving to provide light transmitting indicia. The spacing between successive vernier indicia will, of course, be different than the spacing between adjacent degree marks. The particular spacing being selected in keeping with the fractional reading desired i.e. tenths, sixtieths, thousandths, etc.

In a typical application of the apparatus, photocells 71, 72, and 73 are aligned to provide a zero reference position. Shaft 75 of the device 76 under test is then coupled to member 78 as by set screw 79. This is done with the device 76 set with shaft 75 in its zero position. The zero position is being referred to by way of illustration, a centertap position of a potentiometer under test or other point may be used as the reference setting.

The position of member 78 may now be varied and the corresponding output value shown on a suitable indicator 80 compared with the reading obtained on indicator 81.

Motor 82 drives the drum 60. Lamp 83 follows photocell 71. Lamps 84 and 85 are fixed opposite fixed position photocells 72 and 73.

In FIGURE 3 there is shown a moving belt 90 provided with a series of uniformly spaced distance indicia 91, a series of vernier indicia 92, which are spaced apart by a distance differing from the spacing between adjacent distance indicia by a fractional amount. Marks 93, 93a, etc., are recurring start-reset indicia.

The indicia may be magnetized areas sensed by transducers 94, 95, and 96 shown as soft-iron pole pieces 97 carrying coils 98 in which currents are induced by the magnet fields of the indicia.

The transducers 94, 95, and 96 are connected to the apparatus shown in FIGURE 3 in lieu of the corresponding photocells.

The spacing "D" between transducer 96 and transducers 95 and 94 determine the distance being measured. The transducers would be mechanically coupled to an apparatus being monitored.

It should be understood that the required relative motion between the moving tape 90 and the transducers may be obtained by moving the transducers past the indicia bearing member.

Still other types of indicia may be employed as, for example, opaque marking which may be read photo-electrically by reflected light.

The circuits employed for the various blocks may be conventional commercial amplifiers, flip-flop switches, gating circuits and electronic counters.

While the configuration shown in FIGURE 1 appears limited by mechanical interference between members 7 and 8 to angles of less than 360°, it should be understood that this is merely the result of the simplified presentation and that mechanical configurations not subject to interference are obvious as may be appreciated by reference to FIGURE 2.

It is to be understood that the pick-up configuration shall be capable of resolving individual indicia.

What is claimed is:

1. Measuring means for detecting the interval between a first and a third event, comprising means to produce a continuous series of uniformly spaced first pulses; means to produce a second series of groups of uniformly spaced second pulses at a frequency differing by the same constant fraction from that of said first series with a first pulse of each group of said second series of pulses repeatedly in synchronization with one of said first series of pulses so that there occurs a coincidence of one of said first and second pulses during a subsequent time period with the number of first and second pulses occuring during the period differing by one; means to detect said first event and to provide a first control signal in response thereto; means to detect a second event and to provide a second control signal in response thereto, first counting means coupled to said first pulse producing means; counting pulses of said first series subsequent to the occurrence of said first event in response to said first control signal, and discontinuing the counting of said first pulses subsequent to the occurrence of said second event in response to said second control signal; second counting means arranged to count said second pulses in response to said second control signal; means to detect the simultaneous occurrence of said first pulse and a said second pulse to generate an output signal and means controlled by said generated output signal to interrupt subsequent counting of said second series of pulses, said simultaneous occurrence comprising said third event, and including means for generating said pulses comprising a first set and a second set of spaced indicia members, first and second indicia detecting means for detecting said first and second indicia respectively and generating pulses in response thereto, means for transporting said indicia past said detecting means, said first and second sets of indicia being carried by a common member, and means to adjust the physical spacing between said first and said second detecting means so that said spacing determines the time interval between said first and third events.

2. A measuring device for determining the physical position of a member with respect to a reference point comprising a plurality of uniformly spaced first indicia; first detecting means detecting said first indicia and producing first signal pulses in response thereto; a plurality of uniformly spaced second indicia, the spacing between successive ones of said second indicia differing fractionally from the spacing between successive ones of said first indicia; a start indicia positioned on a line common to a said first and a said second indicia, second detecting means detecting said second indicia and producing second signal pulses in response thereto; third detecting means detecting said start indicia and producing a start signal pulse in response thereto; means to provide relative movement between said first, second, and third detecting means on a common line transverse to the direction of said movement; means for adjusting the spacing between said first and said third detecting means relative to said second detecting means so that the spacing is indicative of the position of the said member with respect to the said reference point; first recording means connected to said first detecting means and initially controlled by said start pulse for recording said first pulses; control means responsive to a first of a series of said second signal pulses for preventing said first recording means from recording subsequent said first pulses; second recording means responsive to said second pulse signals for continuously recording the number of said second pulse signals subsequent to the completion of the recording period of said first recording means; means connected to receive the output of said first and said second detecting means and generate a coincidence pulse signal whenever a said first and a said second signal pulse coincide; and control means responsive to a coincidence pulse for preventing said second recording means from recording any of said second pulse signals subsequent to the generation of a coincidence pulse signal.

3. The apparatus of claim 2 wherein said recording means includes reset means controlled by a said start pulse.

4. The apparatus of claim 2 including means arranged to receive the output of said third detecting means and automatically actuate a reset means in said recording means after a predetermined number of said start pulses have occurred.

5. The apparatus of claim 2 wherein said detecting means are photoelectric cells.

6. The apparatus of claim 2 wherein said detecting means are magnetically actuated means and said indicia are magnetic recordings.

7. The apparatus of claim 2 wherein said indicia are located on a moving belt.

8. The apparatus of claim 2 wherein said first, second and start indicia are positioned in adjacent bands on a rotating member.

9. The apparatus of claim 8 wherein said rotating member is a motor driven disc and said indicia are located in concentric bands.

10. The apparatus of claim 8 wherein said rotating member is a cylindrical member rotated by a motor about its axis of rotation and said indicia are positioned on the outer periphery of said cylindrical member.

11. Measuring means comprising: a member arranged to move at a constant speed, a plurality of uniformly spaced first indicia in a first band and a plurality of uniformly spaced second indicia in a second band adjacent to the first band, said bands being carried by said moving member, the spacing between successive ones of said second indicia differing by a fractional part of the spacing between successive ones of said first indicia; a first and a second pulse recording means; a start indicia positioned on a line common to a said first and a said second indicia; first indicia detecting means; second indicia detecting means; start indicia detecting means; said first and start detecting means being positioned on a reference line transverse to the direction of movement of said indicia so as to detect the passage of said first and said start indicia past said reference line; means to adjustably position said second detecting means relative to said reference line so as to be indicative of a condition to be measured with respect to said reference line; first bistable control means arranged to receive pulses from said start indicia detecting means; a second bistable control means; a first gating circuit arranged to receive the output of said second detector and to control the transmission of pulses therethrough in response to a signal from said first bistable control means; said first bistable control means being responsive to a pulse from said start detecting means to place said first gating circuit in a conducting state so as to transmit pulses from said first indicia detector to said first recording means, said first bistable control means being connected to said second detecting means so as to place said first gating circuit in a non-conducting condition upon receipt of a pulse from the said second detector and to simultaneously place a second bistable control means in a second state; a coincidence detector provided with a pair of input circuits, one of said pair being connected to said first detecting means and the other pair being connected to said second detecting means; a second gating circuit interposed in series between said second detector and said second counter said second gating circuit being under the control of said second bistable control means so as to render said second gating circuit conductive to signals when said second bistable control means is in its first state; said coincidence detector having an output connected to said second bistable control means so that upon occurrence of the coincidental arrival of signals from said first and second detectors a coincidence signal is applied to said second bistable control means to render said second gating circuit non-conductive to signals from said second detector.

12. Measuring means comprising: a member arranged to rotate at a constant speed, a plurality of uniformly spaced first indicia in a first band and a plurality of uniformly spaced second indicia in a second band adjacent to the first band, said bands being carried by said rotating member, the spacing between successive ones of said second indicia differing by a fractional part of the spacing between successive ones of said first indicia; a first and a second pulse recording means; a start indicia positioned on a line common to a said first and a said second indicia; first indicia detecting means; second indicia detecting means; start indicia detecting means; said first and start detecting means being positioned on a reference line transverse to the direction of rotation of said indicia so as to detect the passage of said first and said start indicia past said reference line; means to adjustably position said second detecting means relative to said reference line so as to be indicative of a condition to be measured with respect to said reference line; first bistable control means arranged to receive pulses from said start indicia detecting means; a second bistable control means; a first gating circuit arranged to receive the output of said second detector and to control the transmission of pulses therethrough in response to a signal from said first bistable control means; said first bistable control means being responsive to a pulse from said start detecting means to place said first gating circuit in a conducting state so as to transmit pulses from said first indicia detector to said first recording means, said first bistable control means being connected to said second detecting means so as to place said first gating circuit in a non-conducting condition upon receipt of a pulse from the said second detector and to simultaneously place a second bistable control means in a second state; a coincidence detector provided with a pair of input circuits, one of said pair being connected to said first detecting means and the other pair being connected to said second detecting means; a second gating circuit interposed in series between said second detector and said second counter said second gating circuit being under the control of said second bistable control means so as to render said second gating circuit conductive to signals when said second bistable control means is in its first state; said coincidence detector having an output connected to said second bistable control means so that upon occurrence of the coincidental arrival of signals from said first and second detectors a coincidence signal is applied to said second bistable control means to render said second gating circuit non-conductive to signals from said second detector.

13. The apparatus of claim 12 wherein a third bistable control means is interposed between said start detector and said reset mechanism controlled by said third bistable means and coupled to said counters whereby said counters are reset upon the occurrence of two start pulses.

14. The apparatus of claim 12 including means for resetting said counters to an initial setting, said last named means being responsive to signals from said start detector.

References Cited in the file of this patent

UNITED STATES PATENTS

| | | |
|---|---|---|
| 2,560,124 | Mofenson | July 10, 1951 |
| 2,665,410 | Burbeck | Jan. 5, 1954 |
| 2,665,411 | Frady | Jan. 5, 1954 |
| 2,679,644 | Lippel et al. | May 25, 1954 |
| 2,738,461 | Burbeck et al. | Mar. 13, 1956 |
| 2,742,631 | Rajchman et al. | Apr. 17, 1956 |
| 2,803,448 | Biebel | Aug. 20, 1957 |
| 2,880,512 | Fenemore et al. | Apr. 7, 1959 |

OTHER REFERENCES

"The Vernier Time-Measuring Technique" (Baron), Proceedings of the IRE, vol. 45, #1, January 1957, pp. 21-29. (Copy in Div. 48.) 324-68.